(12) United States Patent
Klein

(10) Patent No.: US 6,173,441 B1
(45) Date of Patent: Jan. 9, 2001

(54) METHOD AND SYSTEM FOR COMPILING SOURCE CODE CONTAINING NATURAL LANGUAGE INSTRUCTIONS

(76) Inventor: Peter A. Klein, 29 Forty-eighth St., Basement Apartment, Weehawken, NJ (US) 07087

(*) Notice: Under 35 U.S.C. 154(b), the term of this patent shall be extended for 0 days.

(21) Appl. No.: 09/174,527

(22) Filed: Oct. 16, 1998

(51) Int. Cl.[7] .................................................. G06F 9/45
(52) U.S. Cl. .............................. 717/5; 717/10; 717/8; 704/9; 706/50
(58) Field of Search ............................ 717/5, 1, 7, 8, 717/10; 704/9, 10, 2; 706/50, 46, 45, 54; 707/103, 104

(56) References Cited

U.S. PATENT DOCUMENTS

| | | | |
|---|---|---|---|
| 5,038,296 | * | 8/1991 | Sano ........................................ 706/45 |
| 5,179,703 | * | 1/1993 | Evans ....................................... 717/3 |
| 5,303,332 | * | 4/1994 | Kirk et al. .............................. 706/50 |
| 5,530,863 | * | 6/1996 | Hino ........................................ 717/7 |
| 5,640,576 | * | 6/1997 | Kobayashi et al. ..................... 704/9 |
| 5,758,160 | * | 5/1998 | McInerney et al. ..................... 717/1 |
| 5,768,593 | * | 6/1998 | Walters et al. .......................... 717/5 |
| 5,778,231 | * | 7/1998 | Hoff et al. ............................... 717/5 |
| 5,794,050 | * | 8/1998 | Dahlgren et al. ....................... 717/8 |
| 5,956,513 | * | 9/1999 | McLain, Jr. ............................. 717/5 |

OTHER PUBLICATIONS

Bryant et al., "Formal Specification of Software Systems Using Two–Level Grammar," IEEE COMPSAC '91, Proceedings of teh Fifteenth Annual Int'l of Computer Software and Applications Conference, Sep. 11–13, 1991, pp. 155–160.*

Wang et al., "A System for Approximate Tree Matching," IEEE Transactions on Knowledge and Data Engineering, vol. 6, Issue 4, pp. 559–571, 1994.*

Wang et al., "Active Rule Processing in the BioCompose Database," IEEE ISORC 98, Proceedings of 1998 First Int'l Symposium on Object–Oriented Real–time Distributed Computing, Apr. 20–22, 1998, pp. 431–437.*

* cited by examiner

Primary Examiner—Kakali Chaki
Assistant Examiner—Than Q. Dam
(74) Attorney, Agent, or Firm—Brown Raysman Millstein Felder & Steiner LLP

(57) ABSTRACT

A system and method for compiling source code comprising natural language declarations, natural language method calls, and natural language control structures into computer-executable object code is disclosed. The system and method allow the compilation of source code containing both natural language and computer language into computer-executable object code. The system and method use a component database, containing components and associated natural language instructions, to select one or more components having an instruction declaration associated with the natural language instruction. A solution manager is used to resolve ambiguities inherent in the use of natural language instructions in the source code.

22 Claims, 9 Drawing Sheets

NIMethodCall:
    NICall 1
    NICall 2
    NICall 3

NICall 1:
    Verb Article ObjectPhrase

NICall 2:
    Verb Noun ObjectPhrase

NICall 3:
    Verb Article Noun Preposition Article ObjectPhrase

ObjectPhrase:
    Noun
    ( Expression )

FIG. 4

| | | |
|---|---|---|
| NlMethodHeader NlMethodHeader | | -> Identifier IdentsAndFormalParmsOpt ')' ';' |
| | | |
| IdentsAndFormalParmsOpt | IdentsAndFormalParms | -> IdentsAndFormalParms; |
| IdentsAndFormalParmsOptNull | IdentsAndFormalParmsOpt | -> ; |
| | | |
| IdentsAndFormalParmsOneIdent | IdentsAndFormalParms | -> Identifier; |
| IdentsAndFormalParmsOneFormalParm | IdentsAndFormalParms | -> NlHeaderFormalParm; |
| IdentsAndFormalParmsListIdent | IdentsAndFormalParms | -> IdentsAndFormalParmsIdentifier; |
| IdentsAndFormalParmsListFormalParm | IdentsAndFormalParms | -> IdentsAndFormalParms NlHeaderFormalParm; |
| | | |
| NlHeaderFormalParm | NlHeaderFormalParm | -> '(' FormalParameter ')'; |

FIG. 5

| | | |
|---|---|---|
| NlSentence | NlSentence | -> CallToken CallToken CallTokensOpt ';' |
| | | |
| CallTokenId | CallToken | -> Identifier; |
| CallTokenLiteral | CallToken | -> Literal; |
| CallTokenExpr | CallToken | -> '(' Expression ')' |
| | | |
| CallTokensOpt | CallTokensOpt | -> CallTokens; |
| CallTokensOptNull | CallTokensOpt | -> ; |
| | | |
| CallTokensOne | CallTokens | -> CallToken; |
| CallTokensList | CallTokens | -> CallTokens CallToken; |

FIG. 6

```
Goal
Goal        Goal->NICall;

NICall 1 NICall    -> Verb ArticleOpt Noun PhrasesOpt;
NICall 2 NICall    -> Verb LiteralToken Noun PhrasesOpt;

//--------------------------------------------------------------
// AticlesPhrases
//--------------------------------------------------------------
ArticleOpt         ArticleOpt         -> Article;
ArticleOptNull     ArticleOpt         -> ;

//--------------------------------------------------------------
// NounPhrase
//--------------------------------------------------------------
NounPhraseSimple   NounPhrase         -> ArticleOpt Identifier;
NounPhraseExpr     NounPhrase         -> Expression Token;
NounPhraseLiteral  NounPhrase         -> LiteralToken;

//--------------------------------------------------------------
// PhrasesOpt
//--------------------------------------------------------------
PhrasesOpt         PhrasesOpt         -> Phrases;
PhrasesOptNull     PhrasesOpt         -> ;

PhrasesOne         Phrases -> Phrases
PhrasesList        Phrases -> Phrases Phrase;

PhrasePrep               Phrase -> PrepPhrase;
PhraseExpressionPhrase   -> ExpressionToken;
PhraseLiteral            Phrase -> LiteralToken;

PrepPhrase               PrepPhrase    -> Prep NounPhrase;

//--------------------------------------------------------------
// Parts of speach productions;
//--------------------------------------------------------------
Article            Article         -> article;
ExpressionToken    ExpressionToken -> Expression;
Identifier1        Identifier      -> Id;
Identifier2        Identifier      -> noun;
LiteralToken       LiteralToken    -> Literal;
Noun               Noun            -> noun;
Noun1              Noun            -> adjnounverb;
Noun2              Noun            -> nounverb;
Prep               Prep            -> prep;
Verb               Verb            -> verb;
Verb1              Verb            -> adjnounverb;
Verb2              Verb            -> nounverb;
```

FIG. 8

```
//----------------------------------------------------------
// Goal        Goal          ->NlHeader;
//----------------------------------------------------------

NlHeader1      NlHeader      -> Verb ArticleOpt Noun PhrasesOpt;
NlHeader2      NlHeader      -> Verb FormalParmToken Noun PhrasesOpt;

//----------------------------------------------------------
// AticlesPhrases
//----------------------------------------------------------
ArticleOpt         ArticleOpt    -> Article;
ArticleOptNull     ArticleOpt    -> ;

//----------------------------------------------------------
// NounPhrase
//----------------------------------------------------------
NounPhraseFormalParm NounPhrase      -> FormalParmToken;

//----------------------------------------------------------
// PhrasesOpt
//----------------------------------------------------------
PhrasesOpt         PhrasesOpt    -> Phrases;
PhrasesOptNull     PhrasesOpt    -> ;

PhrasesOne         Phrases  -> Phrase;
PhrasesList        Phrases  -> Phrases Phrase;

PhrasePrep         Phrase   -> PrepPhrase;
PhraseFormalParm   Phrase   -> FormalParmToken;

PrepPhrase         PrepPhrase  -> Prep NounPhrase;

//----------------------------------------------------------
// Parts of speech productions;
//----------------------------------------------------------
Article          Article            -> article;
FormalParmToken  FormalParmToken    -> FormalParmameter;
Noun             Noun               -> noun;
Noun1            Noun               -> adjnounverb;
Noun2            Noun               -> nounverb;
Prep             Prep               -> prep;
Verb             Verb               -> verb;
Verb1            Verb               -> adjnounverb;
Verb2            Verb               -> nounverb;
```

FIG. 9

```
class Deck
{
        Shuffle the deck.
        {
                System.out.println( Shuf ing the deck. );
        }

Deal a card to a (Player aPlayer).
        {
                System.out.println( Dealing a card to the
                +aPlayer.getName()+ player. );
        }
}
```

FIG. 10

```
Component class CardGame {
}
        Deck OurDeck = new Deck();
        Player User = new Player( user );
        Player Dealer = new Dealer( dealer );
}
```

FIG. 11

```
class CardGame
{
    deck OurDeck = new deck();
    player User = new player( User );
    player Dealer = new player( Dealer );

void nl2_7shuffle_4deck_0_() {OurDeck.nl2_7shuffle_4deck_0_();} void nl3_4deal_4card_2to_1_6player_(player Parm0) {OurDeck.nl3_4deal_4card_2to_1_6player_(Parm0);} void nl4_4deal_4card_2to_4user_0_() {OurDeck.nl3_4deal_4card_2to_1_6player_(this.User;} void nl4_4deal_4card_2to_6dealer_0_() {OurDeck.n13_4deal_4card_2to_1_6player_(this.Dealer);}
}
```

FIG. 12

METHOD AND SYSTEM FOR COMPILING SOURCE CODE CONTAINING NATURAL LANGUAGE INSTRUCTIONS

BACKGROUND OF THE INVENTION

The invention disclosed herein relates generally to computer language compilers. More particularly, the present invention relates to a method and system for compiling natural language instructions in a source code file into computer-executable code.

Most computer programmers prefer to write software programs in high-level languages, such as BASIC, Pascal, C, C++, Java, etc. These languages offer the ability to use instructions which are more flexible, easier to understand, and more intuitive than the limited machine level instructions directly executable by a processor. The source code files written in high-level languages are converted to machine level, object code files by compilers.

Despite the flexibility offered by high-level languages over machine language, modern computer languages are still relatively constraining when compared with non-computer, or natural, languages. Compilers require programmers to limit their programs to the constraints of the available computer languages and to adhere to the strict lexical and syntactical rules of the language. Any mistakes in lexicon or syntax result in errors and an ultimate failure of compilation.

It is therefore desirable to allow programmers to write programs in natural language. However, systems which have attempted to provide this ability usually require substantial processing and storage requirements and involve sophisticated and complex technical solutions such as artificial intelligence to translate natural language into program code. Moreover, while there are many types of problems that can be solved with natural language programming, there are other problems that are better solved with instructions or programs written in existing computer languages. For example, such computer tasks as memory management and processor scheduling are better solved with formal computer languages. In addition to this, existing formal languages already have extensive runtime environments that can be leveraged.

It is thus preferred to have programming languages that are hybrids of natural language and formal programming language. There is thus a need for a compiler which recognizes and processes such a hybrid language and allows programmers to make advantageous use of certain natural language instructions when writing a program, all without the substantial overhead incurred by prior attempts to translate natural language instructions into executable code.

BRIEF SUMMARY OF THE INVENTION

It is an object of the present invention to provide a method of compiling natural language source code instructions into computer-executable object code.

It is another object of the present invention to provide a method of compiling a source code file containing both natural language instructions and computer language (e.g., C++, Java) instructions into computer-executable object code.

It is an another object of the present invention to provide a computer program compiler which compiles natural language source code into computer-executable object code.

It is another object of the present invention to provide a computer programmer the ability to program a computer using natural language.

It is another object of the present invention to provide a computer program compiler which compiles source code containing both natural language and computer language (e.g., C++, Java) content.

The above and other objects are achieved by a method of compiling a source code file containing natural language instructions by using a component database, the component database associating one or more instruction declarations with each of a plurality of natural language instructions. For each of the natural language instructions contained in the source code file, one or more components, each of which having at least one instruction declaration associated with the natural language instruction, is selected, thus resulting in a set of possible solutions for the compilation of the source code file. One of the resulting set of possible solutions is selected and each of the plurality of natural language instructions is associated with one of the components in the selected solution. If there is a natural language instruction in the source code file for which there is not at least one component in the component database which has an instruction declaration associated with it, the compiler will generate a message alerting the user of the inability to compiler the source code file.

Preferably, the component database is stored in a memory, such as a computer's random access memory, a magnetic storage medium, or an optical memory system. Likewise, the source code file is preferably stored in a memory such as a computer's random access memory, a magnetic storage medium, or an optical memory system.

BRIEF DESCRIPTION OF THE DRAWINGS

The invention is illustrated in the figures of the accompanying drawings which are meant to be exemplary and not limiting, in which like references refer to like or corresponding parts, and in which:

FIG. 4 shows syntactic extensions for natural language method calls available in one embodiment of the invention;

FIG. 5 shows the grammars for the natural language method declarations in BNF notation;

FIG. 6 shows in BNF notation the grammars for the natural language method calls;

FIG. 8 shows the grammars for the natural language method calls in BNF notation for an exemplary application of the system and method of the present invention;

FIG. 9 shows the grammars for the natural language method declarations in BNF notation for an exemplary application of the system and method of the present invention;

FIGS. 10–12 are examples of method calls and declarations for an exemplary application of the system and method of the present invention.

DETAILED DESCRIPTION OF THE PREFERRED EMBODIMENTS

Figure 1:
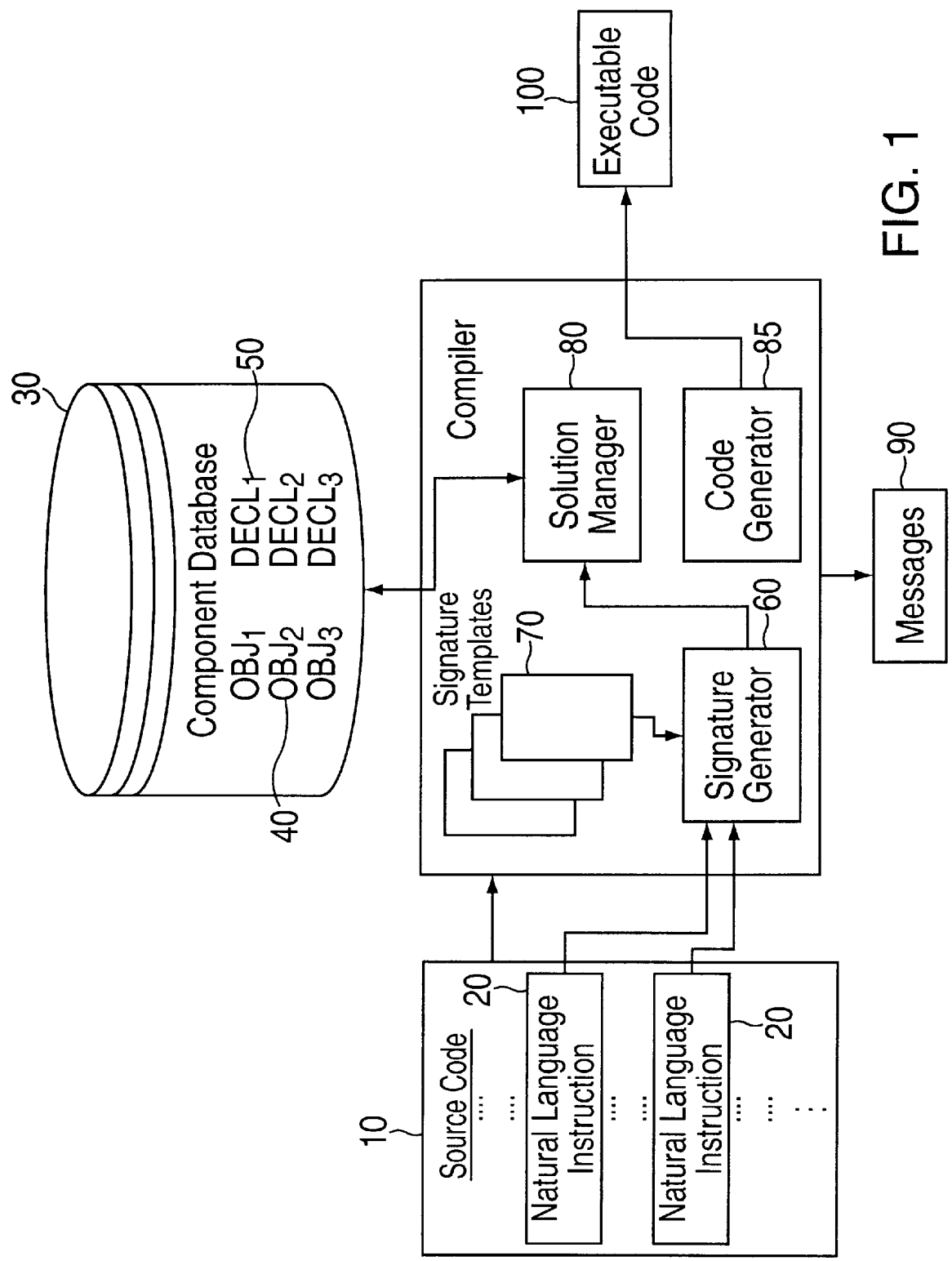
FIG. 1 is a block diagram of a system for compiling natural language instructions to computer-executable object code in accordance with one preferred embodiment of the invention.
Figure 2:
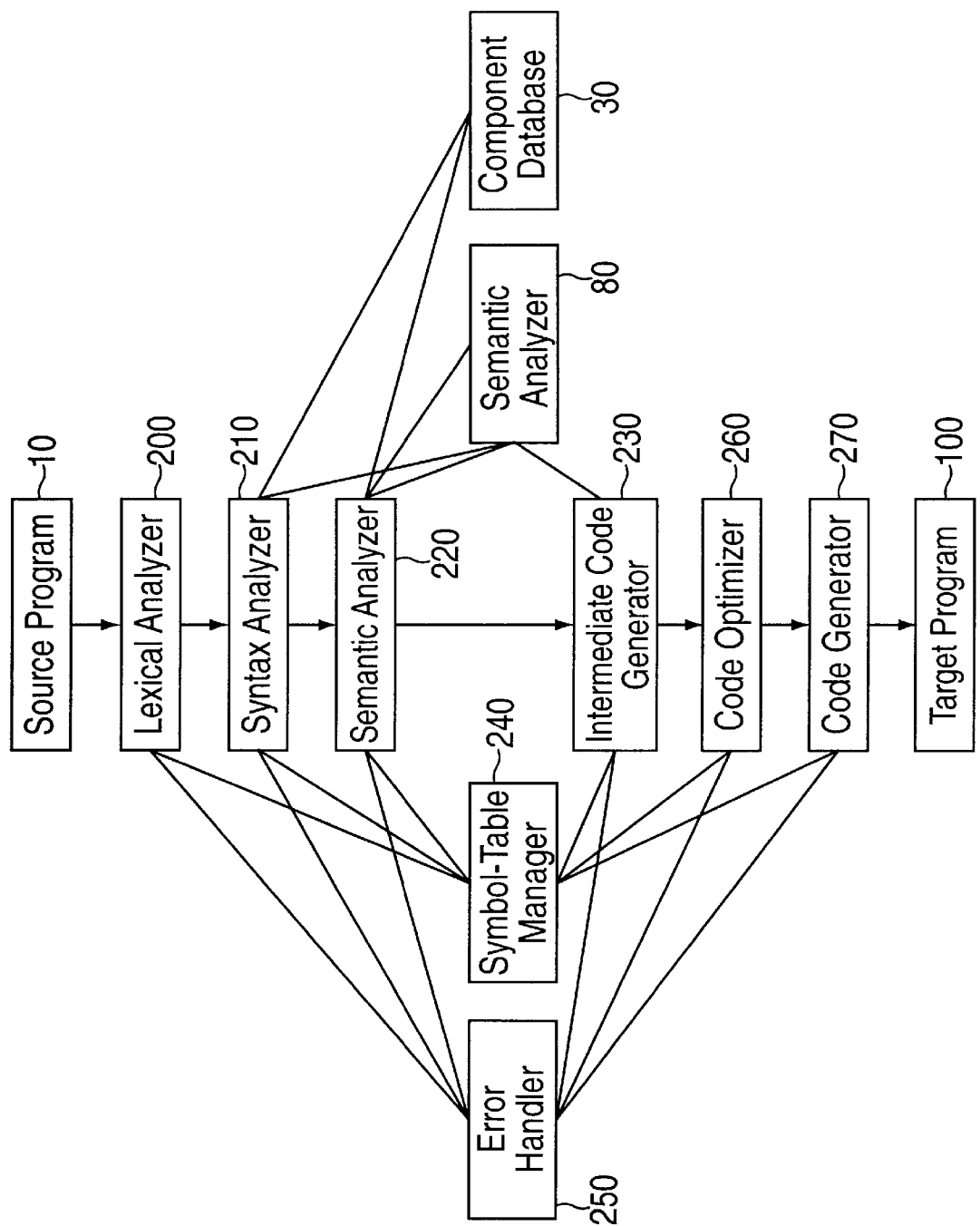
FIG. 2 is a block diagram showing in greater detail parts of the compiler and component database shown in FIG. 1.
Figure 3:
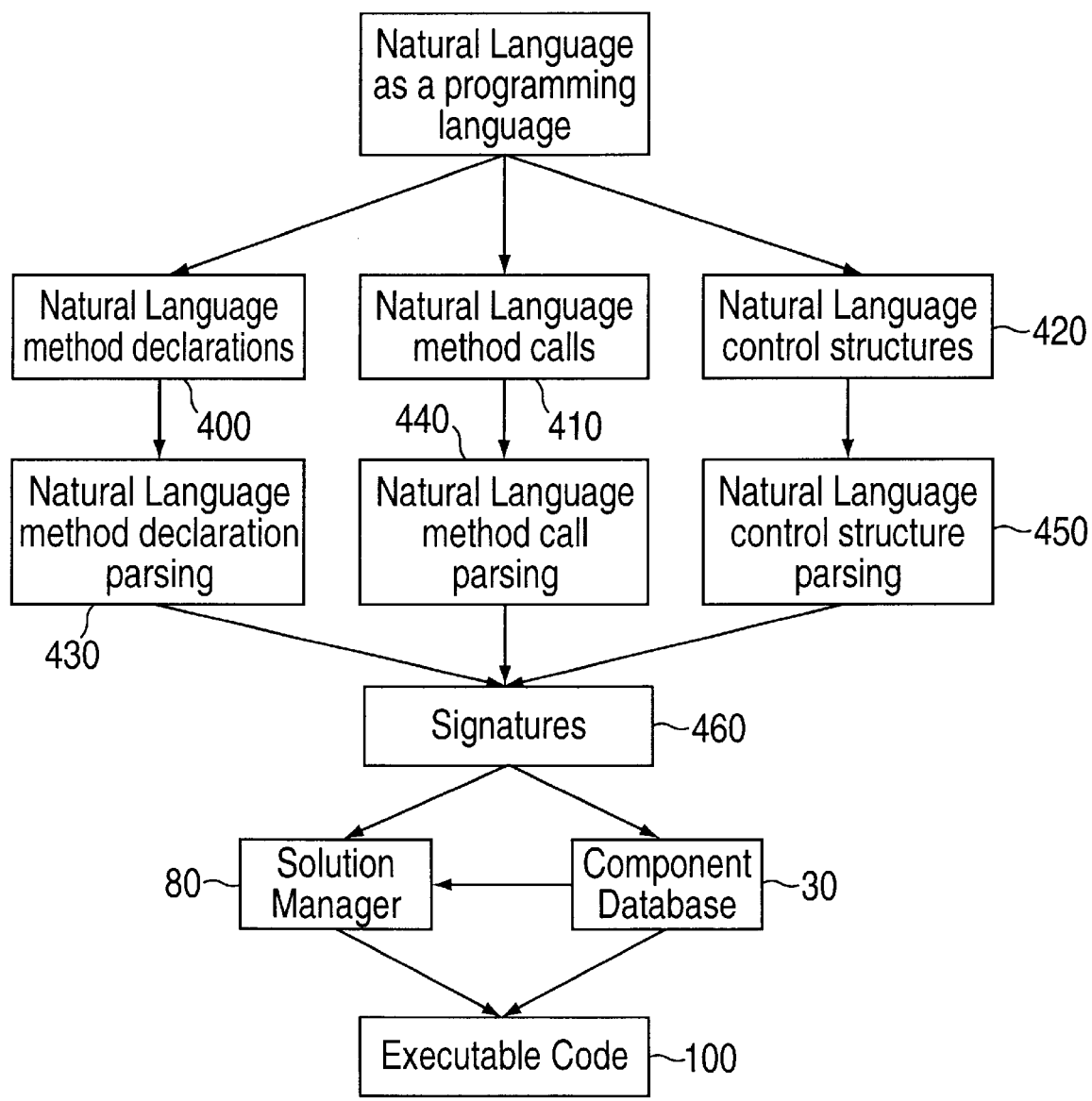
FIG. 3 is flow diagram showing a process of converting natural language program elements into executable code in accordance with one preferred embodiment of the invention.

With reference to FIGS. 1, 2, and 3, one preferred embodiment of the present invention includes a source code file 10, written in whole or in part in a natural language such as English, comprising one or more natural language instructions 20. The natural language instructions 20 can comprise natural language method declarations 400, natural language method calls 410, and natural language control structures 420.

A preferred embodiment of the present invention includes a compiler, programmed in a high-level computer language such as C++ or Java, for compiling the source code file 10 into executable code 100. The compiler includes a signature generator 60, which uses signature templates 70 to generate signatures for each of the natural language instructions 20 in the source code file 10, as further described below. The compiler also includes a solution manager 80 which matches the signatures from the signature generator 60 with associated components stored in a component database 30, as further described below. The component database associates objects 40 and declarations 50. The compiler also includes a code generator 85 which glues the components matched by the solution manager 80 into executable code 100. The compiler generates messages 90 to inform a user of the progress of compilation and of problems associated with the compilation of the source code file 10.

The natural language instructions 20 are inputted to the signature generator 60 which generates signatures 460 corresponding to each of the natural language method declarations 400 in the source code file 10. A signature 460 is an identifier that uniquely identifies a natural language method declaration 400. Well-behaved signature schemes are phrase order independent. Natural language method calls theoretically can have several signatures associated with them. For example, in a preferred embodiment of the present invention implemented in the Java language, certain words can be treated either as nouns or as Java identifiers. Where there is a Java identifier specified, a lookup in a symbol dictionary must be performed by the symbol-table manager 240 to determine whether the identifier is a declared variable. If it is a declared variable, then that type of variable will be used to generate the signature 460. Otherwise, the identifier can be treated as a noun. In the preferred embodiment, the signature generator 60 is coupled to the source code 10 and the solution manager 80.

The solution manager 80 is coupled to the component database 30. The component database 30 comprises a plurality of components 40, each of the plurality of components having one or more natural language method declarations 50 associated with it. The components 40 can be objects, classes, modules, or similar entities. The component database 30 provides a means to store and retrieve components, and to locate components by signature. Additionally, the component database 30 may also provide functionality to locate related signatures given a specified signature. The component database 30 may include a plurality of components 40 linked to a plurality of natural language instruction declarations 50 by a plurality of pointers, such that each component 40 is linked to one or more natural language declarations 50.

The solution manager 80 locates the candidate components that, when glued together, provide a compilation solution for the source code file 10. The solution manager 80 is needed because natural language method calls 410 do not specify which component 40 is being referenced and more than one component may contain the same method call declaration. That is, the solution manager 80 resolves which components 40 should be used in order to ensure that there is one component selected for each natural language method call 410. Generically, the solution manager 80 accepts natural language method calls 410 and returns the signatures 460 and components 40 that allow the source code file 10 to be compiled successfully. If there are no matching natural language method calls in the component database 30, the solution manager 80 may generate messages 90 which suggest the components that should be implemented to successfully compile the source code file 10.

With reference to FIGS. 2 and 3, a preferred embodiment of the invention parses each of the natural language method declarations 400, natural language method calls 410, and natural language control structures 420 contained in the source code file 10. Such parsing includes lexical 200, syntactical 210, and semantic analysis 220, as is well known to those skilled in the art.

Before making a natural language method call 410, there must be a corresponding method declaration 400. By definition, a natural language method declaration 400 is an ordered set of words, formal parameters, and punctuation. Formal parameters can be any passed value. In a strongly typed language like Java, the formal parameters include at least the type and the variable name of the parameter. One possible grammar for natural language method declarations defined in BNF-notation for Java is shown in FIG. 5.

A natural language method call 410 is an ordered set of words, formal parameters, and punctuation. Natural language method calls 410 are the way a programmer invokes the equivalent to a Java method in natural language. A natural language control structure 420 is an ordered set of words, expressions, code blocks, and punctuation. A code block contained in a natural language control structure may be comprised of natural language instructions, computer language instructions, or a combination of the two.

While all of the natural language parsing can be baked into the language grammar, it can be more efficient to implement a two-stage parser in a hybrid language. A two-stage parser is implemented by putting generic natural language productions in the base grammar. When the appropriate production is reduced, a second set of lexemes is created and then passed to the appropriate second stage parser. Natural language method declarations 400, natural language method calls 410, and natural language control structures 420 each have their own second-stage parser. An exemplary BNF-notation grammar for a preferred second-stage parser for natural language method calls is reproduced in FIG. 8. An exemplary BNF-notation grammar for a preferred second-stage parser for natural language method declarations is reproduced in FIG. 9.

After parsing the natural language method declarations 400, natural language method calls 410, and natural language control structures 420, the signature generator 60 generates signatures 460 for each of the natural language instructions 20 in the source code file 10.

In a preferred embodiment of the invention, the signature generator 60 generates signatures 460 for each of the natural language instructions 20 in the source code file 10 by first removing from each natural language instruction 20 all English-language articles. The signature 460 is constructed such that the first two letters are "nl", followed by the total number of words left in the natural language instruction after the removal of the articles. Next comes an underscore character ("_") followed by the number of characters in the first (non-article) word of the natural language instruction, and the first word itself, with no spaces between any of the elements. After the first word of the natural language instruction, the generated signature contains an underscore character and the number of parameters of the first word of the natural language instruction, and then an underscore character. If the given word of the natural language instruction takes one or more parameters, the next characters of the signature will contain a number representing the length of the word used to denote the parameter and the name of the parameter itself, followed by an underscore character. If there is more than one parameter associated with a given word in the natural language instruction, the process will be repeated so as to include all parameters for a given word of the natural language instruction before next generating that part of the signature corresponding to the next non-parameter word (if present) in the natural language instruction. The process is repeated such that the complete signature contains elements denoting all words and parameters contained in the natural language instruction. A new signature is then generated for the next natural language instruction in the source code file 10 and the process is repeated until a signature has been generated for each natural language instruction in the source code file.

By way of example, the signature generating method of a preferred embodiment will generate the signature: "nl2_7shuffle_4deck_0_" for the natural language instruction: "Shuffle the deck." Likewise, the signature generating method of the same preferred embodiment of the invention will generate the signature: "nl3_4deal_4card_2to_1_6Player" for the natural language instruction: "Deal a card to a (Player aPlayer)." While the signature generating algorithm of a preferred embodiment has been discussed, the present invention is not limited to using any particular type of signature generation.

In a preferred embodiment of the invention, components have been added to Java by creating a new class modifier component. A class with this modifier us referred to as a component class. Component classes are stored in the component database 30. Not only are natural language method declarations in the component class considered part of the component, but so are natural language method declarations in the child classes that make up the component class. The natural language method declarations in the child classes are added to the component by creating stub methods in the component class having the sole purpose of calling the appropriate natural language method in the child class.

The purpose of the solution manager 80 is to locate candidate components such that when glued together they provide a compilation solution for the source code 10 file. The solution manager 80 is needed because natural language method calls 410 do not specify which component is being referenced and more than one component may contain the same method declaration 400. In other words, the solution manager 80 resolves which components should be used in order to ensure that there is one component for each natural language method call 410.

Figure 7:
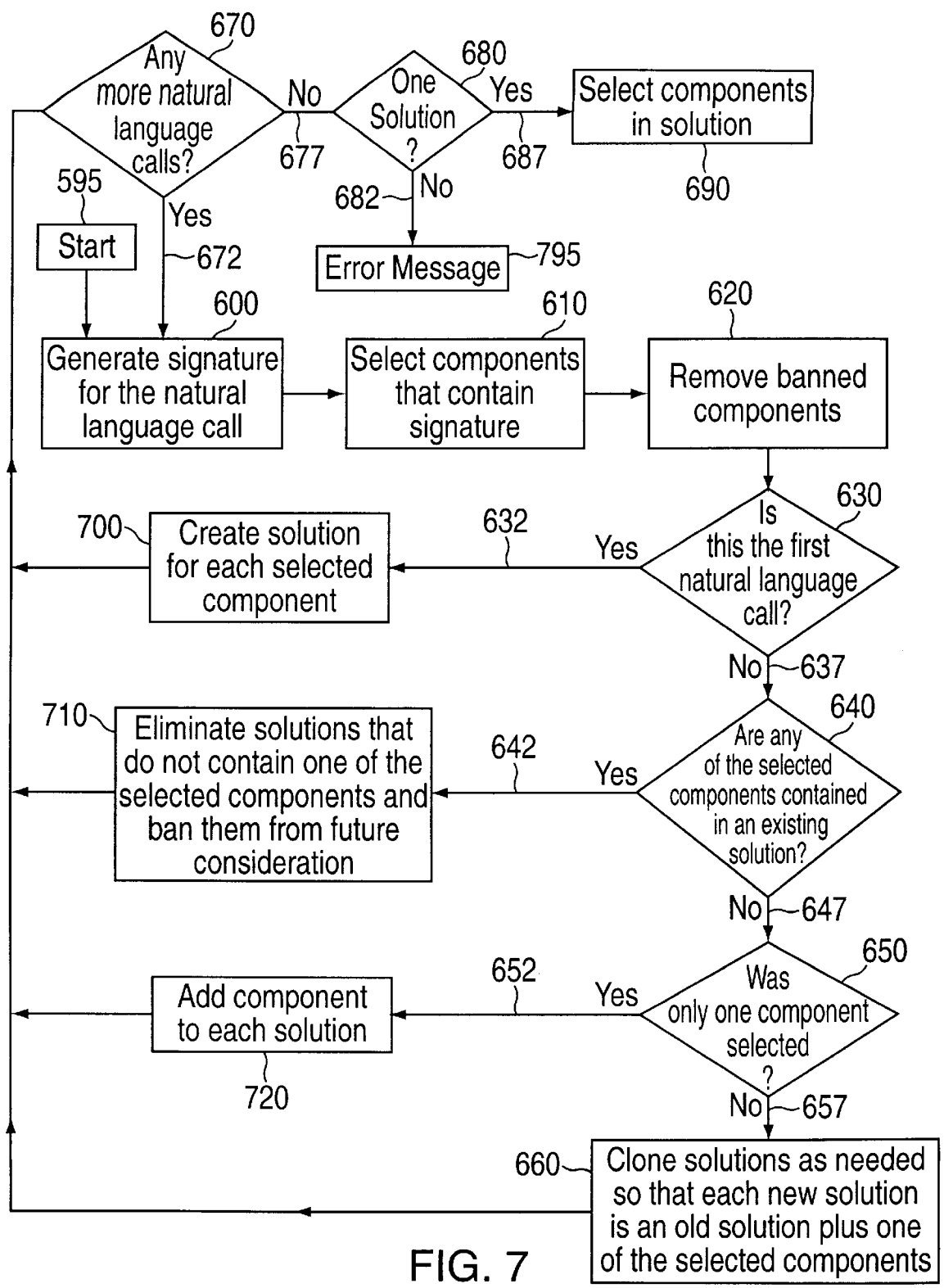
FIG. 7 is a flow chart showing the process of managing solutions to resolve components in accordance with preferred embodiments of the present invention.

Referring to FIG. 7, a component resolution process is used to solve the problem of the inherent vagueness of natural language. The component resolution process starts 595 by generating a signature for each natural language call 600 within scope. Scoping rules are required for the component resolution process to accurately apply solutions to different parts of the source code. For example, in a preferred embodiment of the invention in the Java language, the scope may be a Java class. In another preferred embodiment of the invention, implemented in the Visual Basic language, the scope may be a window. Referencing the component database 30, which associates components 40 with signatures 460, the component resolution process selects all those components 40 associated with the signature 460 generated for a given natural language call 610. If this is the first natural language call 632, the component resolution process creates a solution for each of the selected components 700. If this is not the first natural language call 637 and any of the selected components are contained in an existing solution 642, the component resolution process eliminates those solutions that do not contain one of the selected components and bans them from future consideration 710. If none of the selected components are contained in an existing solution 647, and only one component was selected 652, that component is added to each solution 720. If more than one component was selected 657, the solutions are cloned as needed so that each new solution is an old solution plus one of the selected components 660.

After (1) the creation of a solution for each selected component 700; (2) the elimination of solutions that do not contain one of the selected components and the banning of those solutions from future consideration 710; or (3) the addition of each component to each solution 720, the component resolution process determines whether there are any more natural language calls 670. If there are more natural language calls 672, the process is repeated, beginning with step 600. If there are no more natural language calls 677, it is next determined whether there is only one solution 680. If there is only one solution 687, then the components in the solution are selected 690. If there are no solutions or if there is more than one solution 682, an error message is generated 795. The error message may indicate that there is one or more unresolved ambiguities in the source code file 10 and may offer suggestions as to which components to use in order to resolve the ambiguities.

With reference to FIGS. 10, 11, and 12, the contents of a source code file for a simple program comprising natural language method declarations and natural language method calls is shown. In this example, the scoping rules include the entirety of the source code file 10. The source code in FIG. 10 shows the use of natural language source code to simulate the shuffling of a deck of cards and the dealing of a card from the deck to a player. The source code in FIG. 11 shows the natural language method declarations for initializing a deck of cards, a (card) player, and a (card) dealer. FIG. 12 shows the signatures generated for the natural language method calls for shuffling the deck of cards, dealing a card to a player, dealing a card to a user, and dealing a card to the dealer.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for compiling a source code file or portion thereof comprising natural language instructions using a component database, the components in the component database each containing one or more instruction declarations each being associated with a natural language instruction, the method comprising:

for each of a plurality of the natural language instructions in the source code, selecting from the component database one or more components having at least one instruction declaration associated with the natural language instruction;

managing a set of one or more possible solutions, at least some of the possible solutions each containing one or more components selected for a plurality of natural language instructions;

selecting one solution from the set of possible solutions; and associating each of the plurality of natural language instructions with one of the components in the selected solution having an instruction declaration associated with the natural language instruction.

2. The method of claim 1, comprising generating a signature of each of the plurality of natural language instructions, and wherein each instruction declaration in the components contains at least in part a natural language instruction signature.

3. The method of claim 2, wherein the step of generating the signature comprises generating the signature in accordance with a predefined template.

4. The method of claim 2, wherein the step of selecting one or more components from the component database for each natural language instruction comprises selecting one or more components having an instruction declaration containing a signature matching the generated signature for the natural language instruction.

5. The method of claim 1, comprising generating a message upon discovery of a given natural language instruction in the source code file or portion thereof for which at least one component having an instruction declaration associated with the given natural language instruction is not contained in the component database.

6. The method of claim 1, wherein the step of managing the set of possible solutions comprises, for a first natural language instruction considered when the set of possible solutions is empty, establishing a possible solution for each of the one or more components selected for the natural language instruction.

7. The method of claim 6, wherein the step of managing the set of possible solutions comprises, for a second natural language instruction considered when the set of possible solutions contains one or more possible solutions, determining whether any of the one or more selected components for the second natural language instruction is contained in a possible solution in the set.

8. The method of claim 7, wherein the step of managing the set of possible solutions comprises, if at least one of the selected components for the second natural language instruction is contained in a possible solution in the set, eliminating from the set any possible solutions which do not contain at least one of the selected components for the second natural language instruction.

9. The method of claim 8, wherein the step of managing the set of possible solutions comprises determining whether any of the eliminated possible solutions contains a component which is not contained in a possible solution remaining in the set, and labeling such component as banned.

10. The method of claim 9, comprising determining whether any component selected for a given natural language instruction has been labeled as banned and reversing the selection of the banned component.

11. The method of claim 7, wherein the step of managing comprising, if none of the one or more selected components for the second natural language instruction is contained in a possible solution in the set, adding each of the one or more selected components to each possible solution to create a new possible solution for each possible solution containing each of the one or more selected components for the second natural language instruction.

12. A computerized system for mapping natural language instructions in a source code file or portion thereof to instruction declarations contained in a plurality of program components, the system comprising:

a component database stored in a memory containing the plurality of program components each associated with one or more instruction declarations contained in the program component;

a components selector for matching each of the natural language instructions with an instruction declaration in the component database and for selecting the one or more components associated therewith;

a solution manager for identifying a solution comprising a set of one or more components such that each natural language instruction is associated with a component in the set; and a converter for converting each natural language instruction to the instruction declaration contained in the component to which the natural language instruction is associated in the solution.

13. The system of claim 12, wherein the solution manager comprises a memory for storing a plurality of possible solutions generated from the components selected by the components selector.

14. The system of claim 13, wherein the solution manager comprises means for comparing one or more first possible solutions generated from one or more first components selected by the components selector for a first natural language instruction with one or more second possible solutions generated from one or more second components selected by the components selector for a second natural language instruction.

15. The system of claim 12, wherein the component database comprises instruction declarations containing at least in part signatures of natural language instructions.

16. The system of claim 15, wherein the components selector comprises a signature generator for generating a signature for each natural language instruction.

17. A system for compiling a source code file comprising natural language instructions, or portion thereof, the system comprising:

a database stored on a computer-readable medium, the database comprising a data structure linking components and instruction declarations;

a processing means connected to the computer-readable medium for selecting from the database those components having at least one instruction declaration associated with at least one of the natural language instructions;

a memory for storing a set of one or more possible solutions, at least some of the possible solutions each containing one or more components selected for a plurality of natural language instructions;

a processing means for selecting one solution from the set of possible solutions; and a processing means for associating each of the natural language instructions with one of the components in the selected solution having an instruction declaration associated with the natural language instruction.

18. The system of claim 17, comprising a processing means for generating a signature for each of the natural language instructions and wherein the database comprises a data structure linking components, instruction declarations, and signatures.

19. The system of claim 18, wherein the processing means for generating a signature for each of the natural language instructions generates the signature in accordance with a predefined template.

20. The system of claim 18, wherein the processing means for selecting from the database those components having at least one instruction declaration associated with at least one of the natural language instructions selects one or more components having an instruction declaration containing a signature matching the generated signature for the natural language instruction.

21. The system of claim 17, comprising a means for generating a message upon determination that a given natural language instruction cannot be associated with at least one component.

22. A memory for storing data for access by a program being executed on a computer for compiling a source code file, the source code file comprising natural language instructions, the memory comprising:

a data structure stored in the memory, the data structure including data used by the program, including:
- a plurality of components, the components comprising objects, modules, and classes;
- a plurality of natural language instruction declarations; and
- a plurality of pointers linking the components and the natural language instruction declarations such that each component is linked to one or more natural language instruction declarations;

the data structure providing the program with the ability to select one or more components based on the presence of a natural language instruction declaration in the source code file.

* * * * *